US006392971B1

(12) United States Patent
Takiguchi et al.

(10) Patent No.: US 6,392,971 B1
(45) Date of Patent: May 21, 2002

(54) FOCUS CONTROL METHOD AND OPTICAL DISC RECORDING/REPRODUCING APPARATUS

(75) Inventors: Taizo Takiguchi, Kanagawa; Yoshimasa Sato, Tokyo; Koso Kashima; Kenji Yamazaki, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/268,982

(22) Filed: Mar. 16, 1999

(30) Foreign Application Priority Data

Mar. 17, 1998 (JP) ............................................. 10-067493

(51) Int. Cl.$^7$ ................................................. G11B 7/00
(52) U.S. Cl. ................................ 369/47.53; 369/53.28; 369/53.35; 369/44.25
(58) Field of Search .......................... 369/44.34, 44.35, 369/44.32, 94, 54, 58, 44.26, 116

(56) References Cited

U.S. PATENT DOCUMENTS

| | | | |
|---|---|---|---|
| 5,164,932 A | * 11/1992 | Fennema et al. | ........ 369/44.29 |
| 5,715,228 A | 2/1998 | Takiguchi | ................... 369/116 |
| 5,828,636 A | * 10/1998 | Matsumoto et al. | ..... 369/44.27 |
| 5,898,656 A | 4/1999 | Takiguchi | ................... 369/59 |
| 5,999,502 A | * 12/1999 | Nakata et al. | ........... 369/44.26 |

* cited by examiner

Primary Examiner—Nabil Hindi
(74) Attorney, Agent, or Firm—Oblon, Spivak, McClelland, Maier & Neustadt, P.C.

(57) ABSTRACT

Test pattern data is recorded on a track of the optical disc, and the other pattern data is recorded on the neighboring track. A focus bias value providing the minimum jitter amount when the test pattern data is reproduced with varying the focus bias, is obtained. Just focusing condition is attained by the focus servo using the focus bias. When the test pattern data is reproduced, the data of these neighboring track is also reproduced simultaneously because the pattern data of the type different from the test pattern data is also recorded on the neighboring track. Particularly, under the defocusing condition, crosstalk amount becomes larger because the beam shape is distorted. With reference to jitter amount, such a mistake that the defocusing condition is erroneously determined as the just focusing condition can be eliminated. That is, the focus servo signal providing the accurate just focusing condition can be obtained.

2 Claims, 7 Drawing Sheets

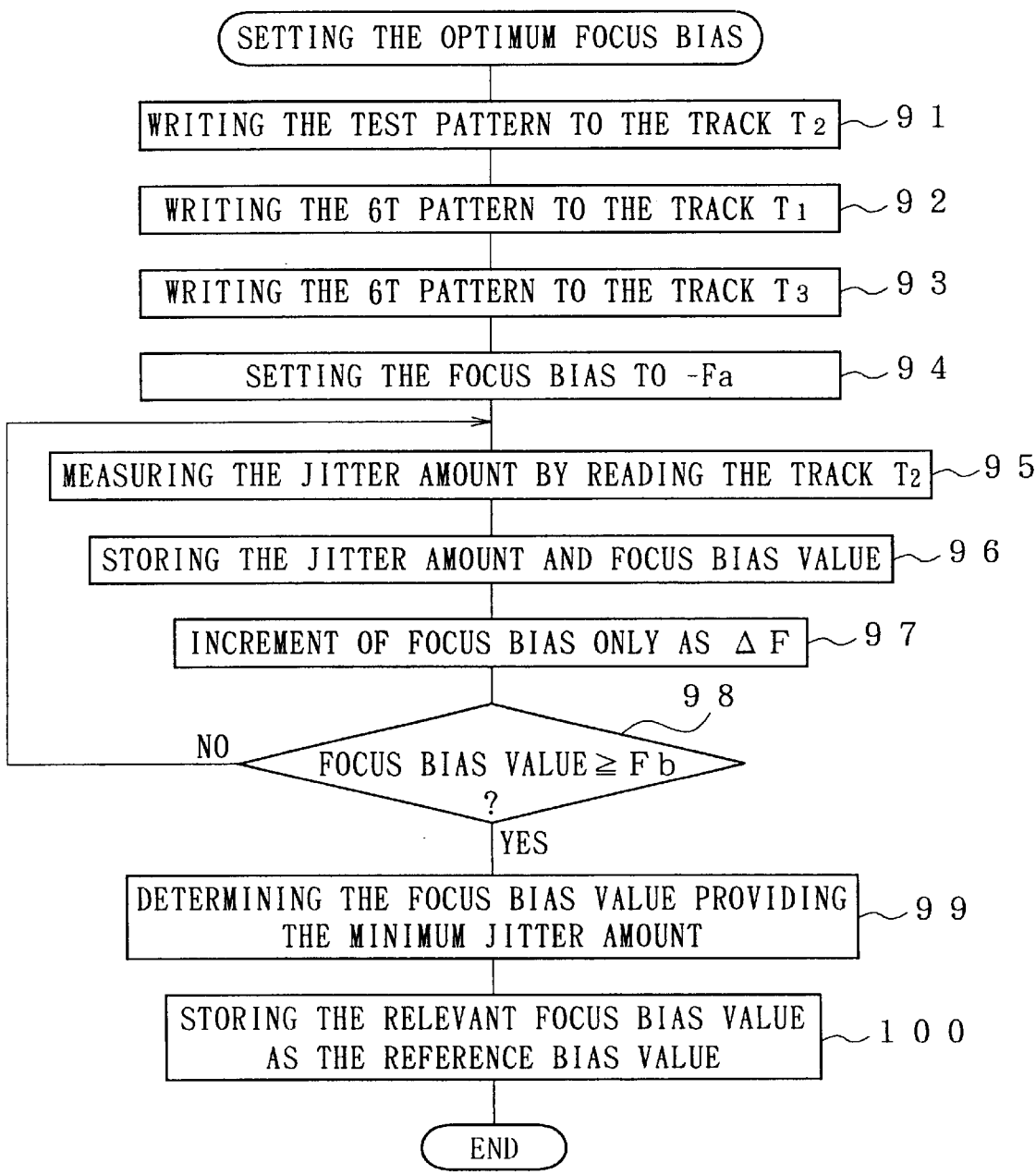

FOCUS CONTROL METHOD AND OPTICAL DISC RECORDING/REPRODUCING APPARATUS

BACKGROUND OF THE INVENTION

1. Field of the Invention

The present invention relates generally to a focus control method and an optical disc recording/reproducing apparatus and more specifically, to acquisition of a more accurate focus bias signal and particularly to improvement of reproducing characteristic in high density recording operation by recording a test pattern data for focus servo signal determination on a predetermined track and also recording the other pattern data on a neighboring track and then determining a focus servo signal by considering amount of crosstalk of the other pattern data when the test pattern data is reproduced.

2. Description of the Related Art

In a recording/reproducing apparatus for reproducing an optical disc such as a magneto-optical disc, data is reproduced while focus adjustment of optical pickup for the optical disc is conducted. In this case, in view of realizing the optimal reproducing characteristic, determining process of the optimum focus servo signal is performed to carry out the optimum focus servo control immediately before the data is reproduced.

Therefore, the particular pattern data recorded on the particular data area has been reproduced while a focus bias value is being changed. Just focus is defined when the amplitude of the reproduced output becomes largest. On this timing, the focus servo signal in such a focus bias value is considered as the optimum focus servo signal in the optical disc.

Meanwhile, when an optical disc for high density recording is used, the track pitch becomes narrow and therefore crosstalk of the signal from the neighboring tracks must be considered. However, in the related art, the optimum focus servo signal is determined not considering such crosstalk at all. That is, the particular data is recorded on the particular track as the focus servo data, but any data is not recorded on the neighboring track of the particular track.

When the recording density becomes high, amount of crosstalk from the neighboring track is also changed by defocusing, because the shape of beam spot is deformed by the astigmatism of the optical pickup system as will be explained later.

When crosstalk from the neighboring track is generated even under the defocusing condition, amplitude of the reproduced signal becomes large in some cases. Thus, it is impossible to simply determine that the just focus is obtained when the amplitude level becomes largest. Accordingly, in the related art, it is impossible in current to accurately determine the focus servo signal to realize the just focus condition.

SUMMARY OF THE INVENTION

The present invention is therefore intended to solve the problems of the related art explained above and it is an object of the present invention to provide a focus control method and an optical disc recording/reproducing apparatus, which can determine the optimum focus servo signal with considering crosstalk from the neighboring track.

According to a first aspect of the invention, we provide a focus control method comprising of recording test pattern data on a predetermined track of an optical disc and the other pattern data on a neighboring track of the predetermined track, reproducing the test pattern data with varying focus bias, and obtaining the focus servo signal providing the just focusing condition from a jitter amount obtained when the test pattern data is reproduced.

In this aspect of the invention, when the test pattern data is reproduced, the pattern data of the type different from the test pattern data is also recorded on the neighboring track. Therefore, the data of the neighboring track is also reproduced simultaneously. Particularly, when defocusing is occurring, amount of crosstalk also increases because shape of the beam spot is distorted.

When amount of crosstalk increases as explained above, the reproducing level becomes high in this case, but jitter element also increases. Therefore, such a mistake that the defocusing condition is erroneously judged as the just focusing condition can be eliminated by making determination with reference to the amount of jitter. That is, the focus servo signal accurately resulting in the just focusing condition can be obtained.

According to a second aspect of the invention, we provide an optical disc recording/reproducing apparatus. Preferably, the apparatus comprises a recording device for recording test pattern data on a predetermined track of the tracks provided in the test pattern area of an optical disc and the other data on a neighboring track of the predetermined track. Further, the apparatus suitably comprises a reproducing device for reproducing the test pattern data from the predetermined track with varying focus bias value, a PLL circuit for receiving the reproduced data, and a jitter amount calculating device for calculating amount of jitter corresponding to the focus bias value when a phase error signal obtained from the PLL circuit is supplied. Additionally, the apparatus desirably comprises a focus servo controlling device for determining the optimum focus bias signal based on the calculated jitter amount, compensating for a focus error signal with the focus bias signal, and also outputting the focus servo signal on the basis of the compensated focus error signal.

In this aspect of the present invention, amount of jitter of the reproduced signal is measured while the focus bias is varied. The reproduced signal also includes crosstalk. Here, the minimum amount of jitter is detected. When jitter is minimum, just focusing is defined. A focus bias value of this just focusing condition is defined as the optimum focus bias value. Thus, the focus servo signal obtained by adding the focus error signal to such optimum focus bias value is defined as the optimum focus servo signal. Since an error rate can be improved by reproducing the signal with the focus servo signal pre-adjusted as explained above, the reproducing characteristic of optical disc can be improved.

The above and other objects and features of this invention will appear more fully hereinafter from a consideration of the following description taken in connection with the accompanying drawings wherein an example is the illustrated by way of example.

BRIEF DESCRIPTION OF THE DRAWINGS

FIG. 7 is a flowchart showing an example for setting the optimum focus bias.

DETAILED DESCRIPTION OF THE PREFERRED EMBODIMENT

Preferred embodiments of a focus control method and an optical disc recording/reproducing apparatus of the present invention will be explained in detail with reference to the accompanying drawings.

Figure 1:
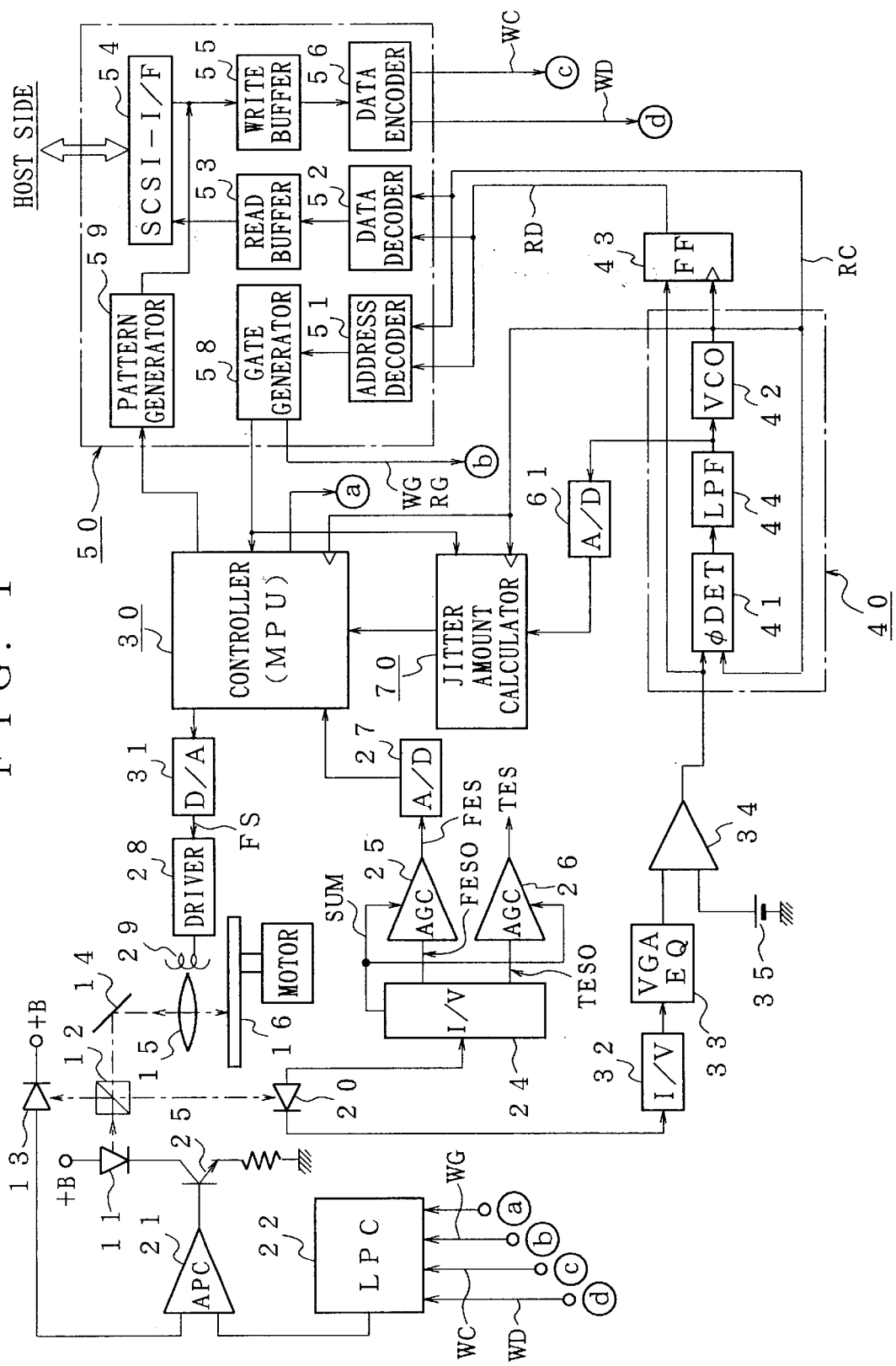
FIG. 1 is a system diagram of the essential portion showing a preferred embodiment of the disc recording/reproducing apparatus of the present invention.

FIG. 1 is a system diagram of the essential portion showing a preferred embodiment of an optical disc recording/reproducing apparatus to which the present invention is applied. In an embodiment as shown in this figure, a laser 11 emits laser beam and the emitted laser beam is isolated in the traveling direction by a beam splitter (BS) 12 forming an optical pickup means. A part of this laser beam is incident to a monitoring photo detector (MPD) 13 for monitoring the power of laser beam and the other part is radiated to the surface of an optical disc 16 via a reflection mirror 14 and an objective lens 15.

The photo detector 13 detects the laser power and converts it to a current (Im). The current is then supplied to an error amplifier (APC amplifier) 21 for emission power control. Meanwhile, a laser power controller (LPC) 22 transmits to the error amplifier 21 a current Iout, which becomes the reference laser power, and controls impedance of a control transistor 25 with its amplifier output. Thereby, a current applied to the laser 11 is regulated so that the current Im converted from the laser power always equals to the current Iout and then the laser power is always controlled to a constant value.

The reference current Iout output from the laser power controller 22 may be output as the reference current waveform having various waveforms by updating a register, etc. provided within the controller 22 with an instruction from the main controller (MPU structure) 30. Therefore, the laser power can be controlled respectively depending, for example, on the erasing mode, recording mode and reproducing mode.

The laser beam reflected by the optical disc enters a photo detector (PD) 20 for signal reproduction via the beam splitter 12. The photo detector 20 is formed of 4-split photo-detecting elements and respective photo-detecting signals are supplied to a first current/voltage converter (IV) 24. This current/voltage converter 24 generates a plurality of servo signals. In an example of the figure, a focus error signal FESO, a tracking error signal TESO and a composite signal SUM adding all signals from the four photo-detecting elements are generated.

The focus error signal FESO and tracking error signal TESO are respectively supplied to AGC circuits 25, 26 and then respective error signals are normalized by the composite signal SUM in order to prevent the values of error signals from being changed by the laser emission power. An A/D converter 27 receives the normalized focus error signal FES and converts it to a digital signal and then supplies the digital signal to a controller 30 of the MPU structure.

The controller 30 generates the optimum focus servo signal (focus servo signal). The controller 30 transmits it to a D/A converter 31. After the D/A converter 31 converts it to an analog signal, the converter 31 then supplies the analog signal to a driver 28 of a focus coil 29 to adjust a gap between the objective lens 15 and the disc surface for the purpose of focus adjustment. That is, the focus servo is effectuated. Accordingly, the circuit system up to the driver 28 including the AGC circuit 25 and controller 30 functions as the focus servo control means. This focus servo control means will be explained later in detail.

Control in the tracking direction of the optical disc 16 is also performed in the same manner as the focus control and the tracking servo is effectuated using the tracking error signal TES so that the focusing is always made on the track of the optical disc 16. The structure of this tracking servo is not explained here.

An output of the photo detector 20 is supplied to a second current/voltage detector 32 and then the detector 32 converts it to the data signal including address signal. A variable gain amplifier (VGA) 33 optimizes the amplitude of this data signal. Optimized data signal is then supplied to a slicer 34 via an equivalent filter (should be included in the variable gain amplifier 33). This data signal is then converted to a binary data (digital data) when the reference voltage 35 slices it.

The binarized digital signal is supplied to the PLL circuit 40. This PLL circuit 40 comprises a phase comparator 41, a voltage variable oscillator (VCO) 42 and a low-pass filter 44. The phase comparator 41 compares the digital signal in its phase with a read clock signal RC output from the voltage variable oscillator 42. Thereby, a phase error is converted to a voltage by a low-pass filter 44 to obtain a phase error signal. This phase error signal controls the oscillation frequency of the voltage variable oscillator 42 and thereby the read clock signal RC synchronized with the digital signal can be obtained.

The extracted read clock signal RC is supplied, together with the digital signal, to a flip-flop circuit 43. The flip-flop circuit 43 generates the read data signal RD, which is perfectly synchronized with the read clock RC.

The read data signal RD and read clock signal RC are supplied to an optical disc controller block (ODC) 50. The optical disc controller block 50 is provided with an address decoder 51 and an address signal is decoded by applying the read data signal RD and read clock signal RC explained above to the above optical disc controller block 50.

The read data signal RD and read clock signal RC are then supplied also to a data decoder 52 and the reproduced data is decoded during the address management based on the decoded address signal. The reproduced data decoded is supplied to an interface 54 such as SCSI controller, etc. via the read buffer circuit 53 and is then output to a terminal in the host apparatus side.

On the other hand, when data is recorded to the optical disc 16, the controller 22 sets the optimum write power on the basis of the power setting signal from the main controller 30. Moreover, the data or address information to be recorded is supplied from the host side. A data encoder 56 receives said data or address information via the write buffer circuit 55 and encodes received data or address information previously. When the address to be recorded is being scanned with the laser, a gate signal generator 58 provided in the optical disc controller block 50 outputs a timing signal (write gate) WG. In synchronization with this output timing, the write data WD and write clock signal WC as the clock for data synchronization are respectively supplied to the controller 22.

Therefore, the controller 22 converts the recording data to the recording current Iout in such timing. The laser 11 is modulated by a recording current and pits are formed on the optical disc 16. When a phase changing type disc is used as the optical disc 16, data can be recorded only with modulation of laser power. When a magneto-optical disc is used as the optical disc 16, the external magnetic field is also used simultaneously for the recording of data. Therefore, the external magnetic field must be generated using an external magnet when the magneto-optical disc is used as the optical disc 16.

In the case of erasing the data, the erasing process is also executed on the basis of an instruction from the controller 30. First, with an instruction from the controller 30, the controller 22 is set to the erase mode (erase power). When a target address is supplied from the optical disc control block 50, the designated erasing power is radiated on the optical disc 16 on the basis of the timing of write gate to erase the data. When a magneto-optical disc is used as the optical disc 16, the external magnet is simultaneously controlled as explained above.

In the present invention, the optimum focus bias value is found and thereby the focus servo by the optimum focus servo signal can be realized. Moreover, in the present invention, a pattern data (for example, a pattern data other than the test pattern data) is recorded, in addition to the test pattern data, at least on the single side track and preferably on both-side tracks of the track, where the test pattern data is recorded, so that amount of crosstalk from the neighboring track(s) can be considered.

Next, since jitter element increases when crosstalk is mixed to the reproduced signal from the neighboring track(s), the optimum focus servo point, namely the just focus point in the condition where crosstalk is considered can be found by monitoring the amount of jitter.

Figure 2:
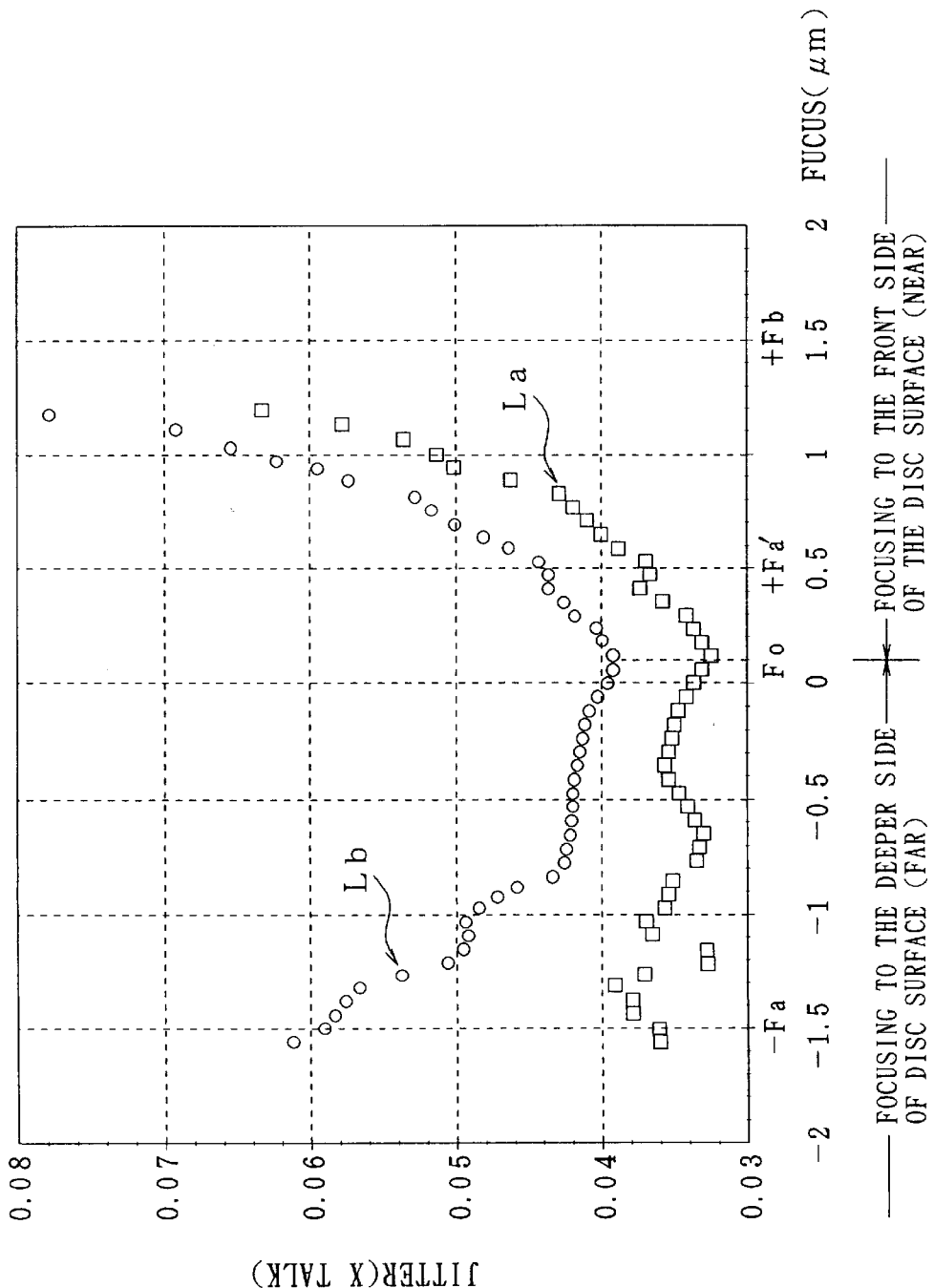
FIG. 2 is a diagram showing a relationship between crosstalk and amount of jitter.

Here, influence on jitter depending on crosstalk will be explained with reference to FIG. 2. A sample value La as shown in FIG. 2 shows the amount of jitter in such a condition that only the test pattern data is recorded and any data is not recorded in the neighboring tracks. A sample value Lb as shown in FIG. 2 shows the amount of jitter in such a case that the pattern data different from the test pattern data is recorded in both neighboring tracks.

As will be apparent from the sample value La, when there is no crosstalk from the neighboring tracks, amount of jitter almost does not change when the focus position is ranged from —1.5 μm to +0.5 μm for the surface of optical disc 16. Here, a positive value indicates that the just focus point is located before the surface of disc (optical pickup side) and therefore a negative value indicates that the just focus point is located in the deeper side of the disc surface. Therefore, it can be said that the focus bias value almost does not give any influence on the reproducing characteristic when it is ranged from –Fa to +Fa'. Since the focus bias value Fo indicates the just focus, the other area is all defocusing area.

Meanwhile, when data is recorded to the neighboring tracks, influence by crosstalk is generated distinctively and not only this crosstalk change, to a large extent, the original jitter but also the focus point changes the amount of jitter.

Change of jitter by crosstalk and large change of jitter even in the defocusing condition as explained above are roughly considered to be resulting from the following physical phenomenon.

Figure 3A:
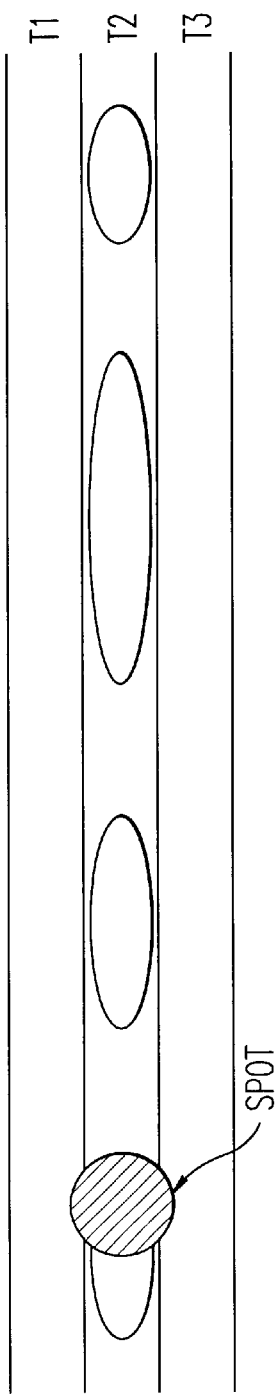
FIGS. 3A to 3C are diagrams showing relationships between the defocusing and beam spot when data is not recorded in the neighboring tracks.
Figure 3B:
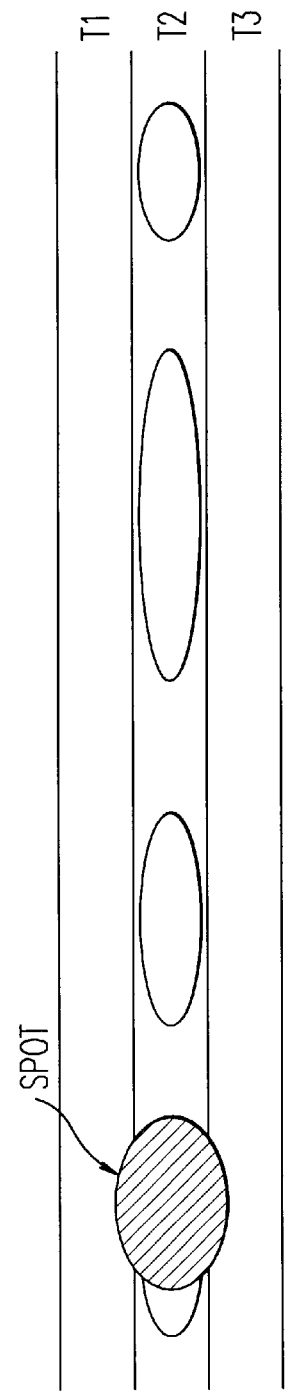
Figure 3C:
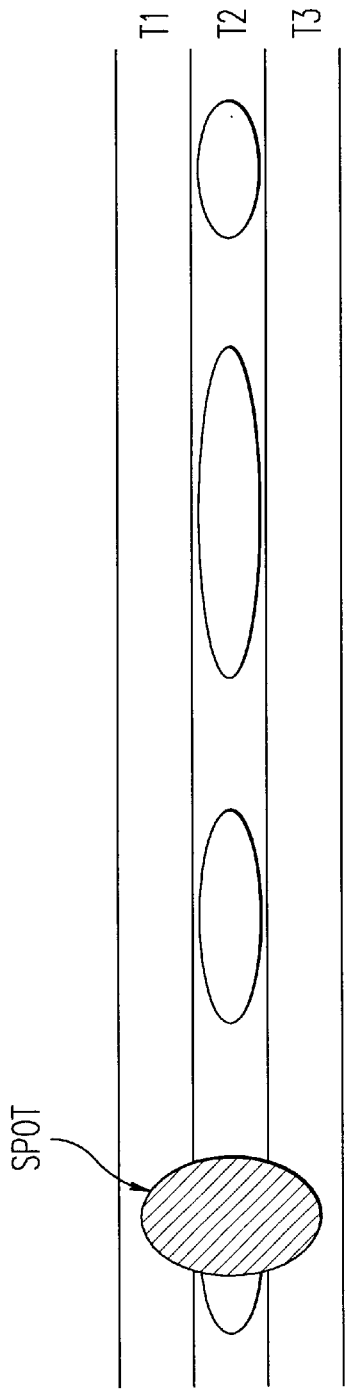

FIGS. 3A to 3C schematically show the beam spot condition focused on the optical disc 16 when focus is changed. The tracks T1 to T3 are prepared as three tracks to record the test pattern on the most outer circumference of the optical disc. Among these tracks, the test pattern data is recorded to the center track T2 and no data is recorded to the neighboring tracks T1, T3 as in the case of the related art.

FIG. 3A shows an example of just focus condition and the beam (spot) has almost circular shape in this case. Meanwhile, FIG. 3B shows an example of defocusing of the objective lens 15 in the near side for the optical disc 16. In this case, the beam spot has the elliptical shape including the longer side in the traveling direction. This condition is generated when the focus bias is weak.

FIG. 3C shows an example of defocusing in the far side of the optical disc 16. In this case, the focus bias is too extensive and the beam spot has an elliptical shape including the longer side in the direction diagonal to the traveling direction.

The reason why the beam spot has the elliptical shape is that astigmatism exists in the optical pickup system including the optical system such as the laser 11 and objective lens 15. Jitter amount in this case is indicated by the sample La of FIG. 2. That is, jitter changes only a little because there is no crosstalk from the neighboring tracks.

Figure 4A:
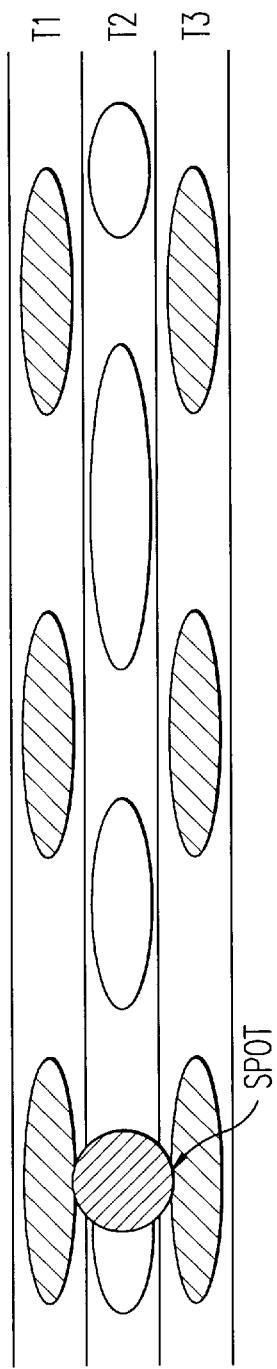
FIGS. 4A to 4C are diagrams showing relationships between the defocusing and beam spot when data is recorded on the neighboring tracks.
Figure 4B:
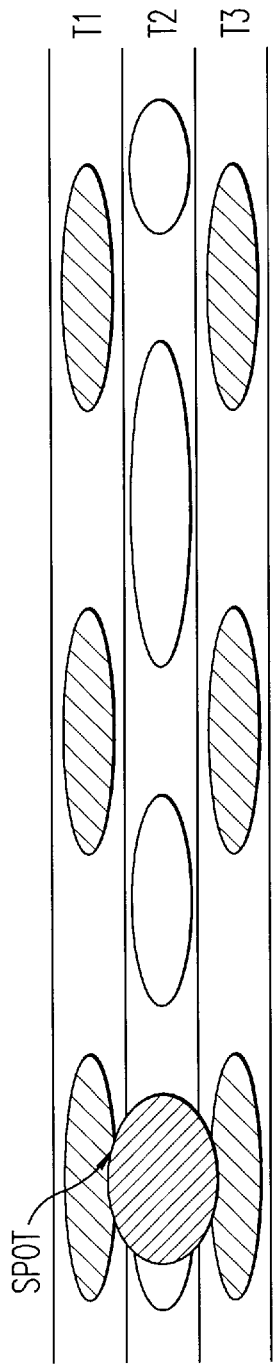
Figure 4C:
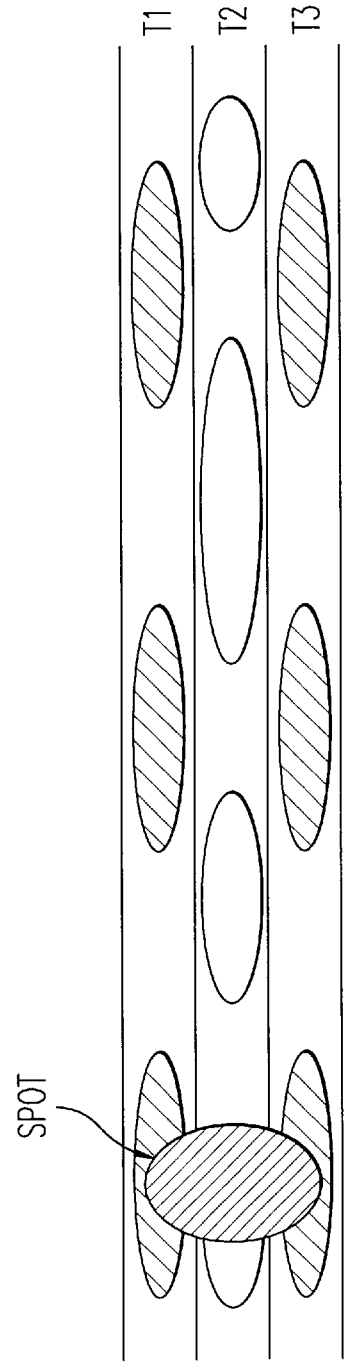

Meanwhile, FIGS. 4A to 4C schematically show the condition of beam spot when the pattern data is recorded on both neighboring tracks, corresponding to FIGS. 3A to 3C. FIG. 4A shows the relationship between the track and beam spot under the just focusing condition, while FIG. 4B and FIG. 4C show the relationship under the defocusing condition.

FIG. 4A shows the circular beam spot because of the just focusing condition. In this case, resolution in the beam traveling direction is high and crosstalk from the neighboring tracks does not give large influence. Therefore, the jitter amount is minimized in this case.

However, when the laser beam is defocused before (near side) the optical disc 16 (FIG. 4B) and when it is defocused in the deeper side (far side) (FIG. 4C), the beam spot has the elliptical shapes having different longer sides. That is, the beam spot expands in the reading direction and in the direction diagonal to such reading direction and as a result the resolution is lowered, increasing the jitter amount. The shape of beam spot suggests that jitter amount increases in FIG. 4C.

Therefore, in the present invention, the focus servo is determined previously considering crosstalk and detects the best focus point considering the balance of resolution and crosstalk in the reading direction.

In the embodiment of the present invention as shown in FIGS. 4A to 4C, the test pattern data is recorded on the center track T2 using three tracks for recording the test pattern. This test pattern data is an incremental pattern data including the mark lengths of all lengths in which mark length sequentially becomes longer.

The other pattern data is recorded on each of the neighboring tracks T1 and T3 of the track T2. More specifically, the pattern data including a large amount of crosstalk to the track T2 is recorded. For example, the 6T pattern data is considered. The similar crosstalk can also be expected by recording the data, for example, having the write power higher than the ordinary power even if the data is different from the 6T pattern data.

As these pattern data, a pattern signal from a pattern generator 59 provided in the optical disc control block 50 is used and its output timing is instructed by the controller 30.

After the pattern data is recorded on the respective tracks as explained above, the data of the center track T2 is reproduced. Therefore, as shown in FIG. 1, the focus error signal FES output from the AGC circuit 25 is converted to digital signal by the A/D converter 27 and the converted digital signal is then supplied to the controller 30.

Figure 5:
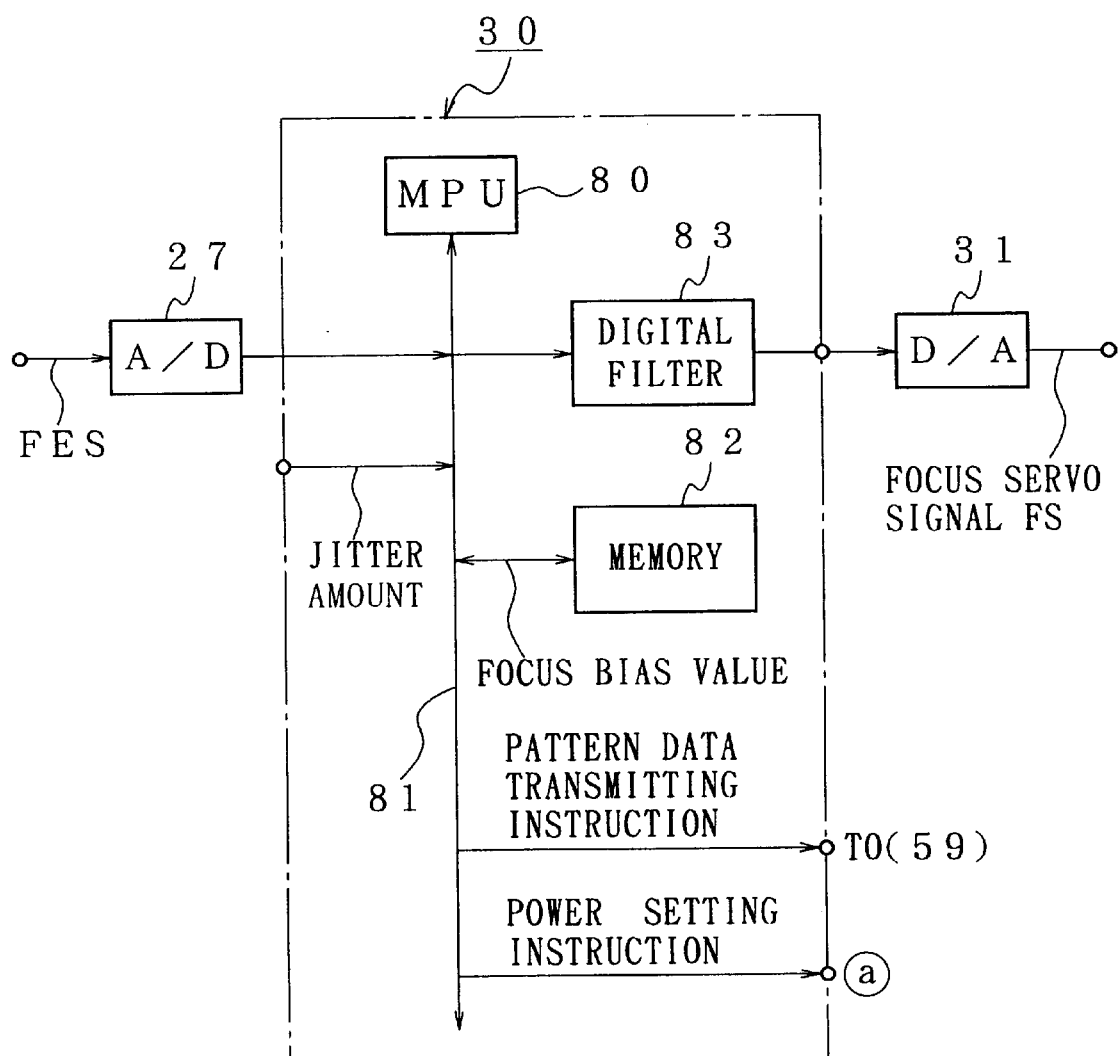
FIG. 5 is a diagram showing a structure of a part of the controller forming a focus servo control means.

FIG. 5 shows a part of structure of the controller 30. A memory 82 is connected via the bus 81 to the MPU 80. This memory 82 stores a plurality of focus bias values (−Fa to +Fb) shown in FIG. 2. The focus bias value extracted from the memory 82 is added to the focus error signal FES obtained via the bus 81 and the compensated focus error signal is supplied to the digital filter 83 via the bus 81 for the filtering purpose. Thereafter, the D/A converter 31 provided at the outside of controller 30 converts this focus error signal to the analog focus servo signal FS.

Therefore, the objective lens 15 is given the focus servo with the focus servo signal corresponding to the focus bias value. In this case, jitter amount is calculated from the reproduced data and the calculated jitter amount is stored, together with a focus bias value, in the jitter storing area of the memory 82 via the bus 81.

This process is continued until the focus bias value reaches +Fb through increment of the focus bias value and the focus bias value and jitter value in this process are respectively stored.

When jitter amounts for respective focus bias values are measured while the data reproducing operation is continued by sweeping step by step the focus bias value, the minimum jitter amount can be obtained. The focus servo signal in the focus bias value providing the first jitter amount is subsequently used as the optimum focus servo signal.

Figure 6:
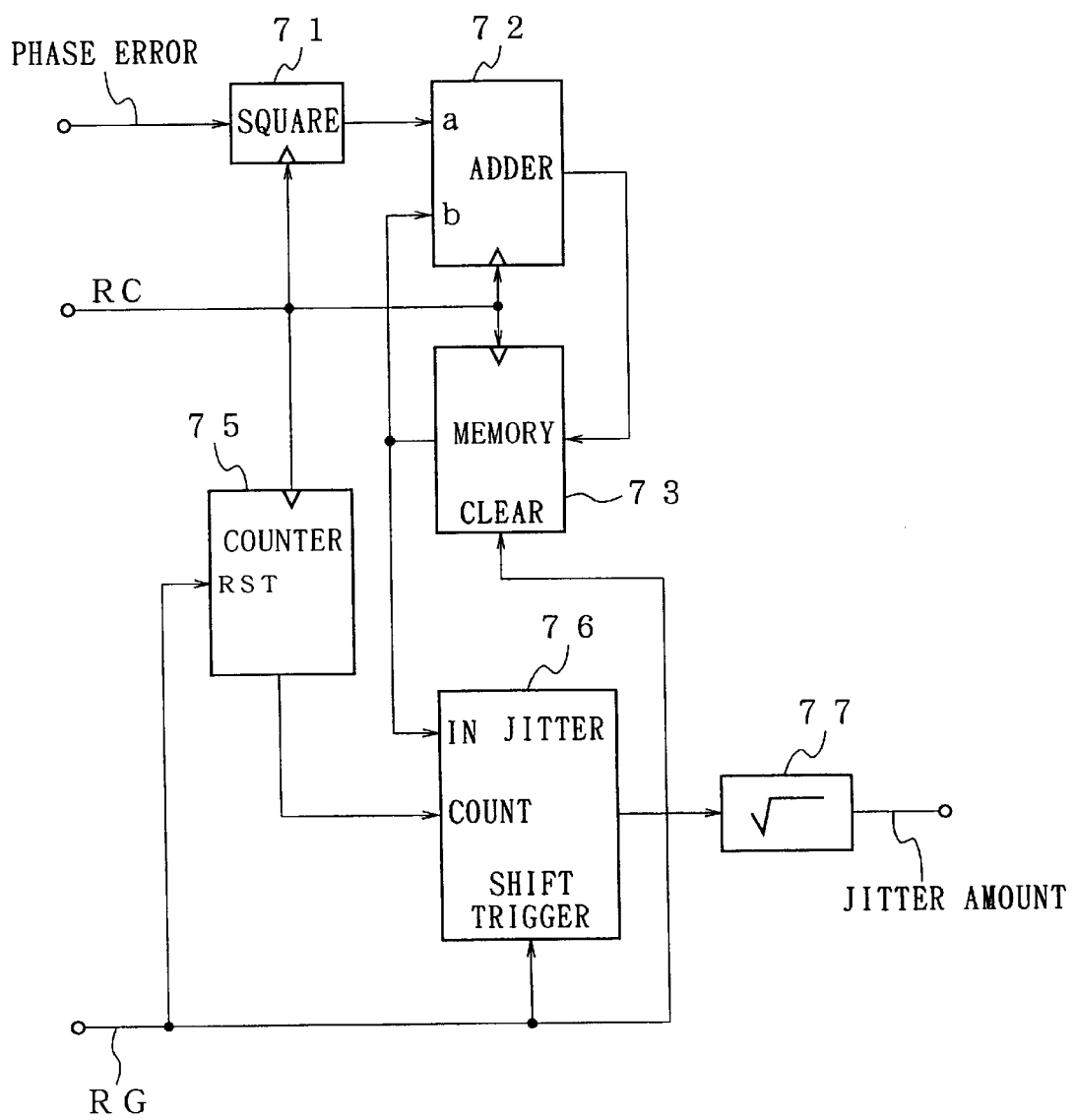
FIG. 6 is a system diagram showing a preferred embodiment of a jitter amount calculator as the jitter amount calculating device.

FIG. 6 shows a practical example of a jitter amount calculator 70 as the jitter amount calculating device. This jitter amount calculator 70 is structured on the basis of the square mean concept.

In FIG. 6, the digital phase error signal sampled in the timing of the read clock signal RC by the A/D converter 61 is digitally square-processed by the square circuit 71. Since the digital phase error signal is squared to eliminate the processing of sign, averaging may be executed using the absolute value.

The squared digital phase error signal is supplied to an adder 72 for the accumulation process with an output of the memory 73. The square circuit 71, adder 72 and memory 73 are all operated in the timing of the read clock signal RC.

Meanwhile, a counter 75 counts the number of read clocks. This count output and an accumulated data from the memory 73 are supplied to a level shifter 76 and thereby the accumulated data is shifted as much as the counted value of the read clock for the purpose of averaging. Thereafter, such data is supplied to a square root calculator 77 for the square-root processing of the averaged output. The value obtained by the square root processing is the jitter amount to be obtained.

The counter 75 and memory 73 are cleared with the rising edge of the read gate pulse from the gate generator 58 (see FIG. 1). The level shifter 76 is controlled to shift the rising edge of the read gate pulse as much as the counted value from the counter 75. The square root process and normalizing process may also be eliminated.

An example of the process to obtain the focus bias value for obtaining the optimum focus servo signal will be explained with reference to FIG. 7. A control program for this process is built in the MPU 80. The optimum focus bias process is conducted each time when the optical disc 16 is loaded to the optical disc recording/reproducing apparatus.

First, the test pattern (increment pattern) is recorded on the track T2 (step 91) and the 6T pattern data is recorded in the same manner on the neighboring tracks T1, T3 (steps 92, 93). Next, the focus bias is set to −Fa and the data of track T2 is reproduced to measure the jitter amount under such focus servo condition (steps 94, 95). The jitter amount calculated and the focus bias value are stored in the table of the memory 82 (step 96).

Next, the jitter amount and focus bias value when the data is reproduced under the focus servo condition where the focus bias value is incremented only by ΔF, are stored (steps 97, 98, 95). While the focus bias value is varied as explained above, operation is continued until the focus bias value becomes +Fb. When such value reaches +Fb, the jitter mount measuring mode is completed.

Thereafter, the focus bias value providing the minimum jitter amount is obtained and this focus bias value is stored in the memory 82 as the optimum focus bias value, namely as the reference focus bias value used subsequently. Thereby, a series of optimum focus bias setting process is completed (steps 99, 100).

The optimum focus bias value obtained in the step 99 approximates a quadratic curve based on the jitter amount obtained and the bottom value of the approximated quadratic curve can be set as the optimum focus bias value.

As explained above, in the focus control method of the present invention, the pattern data of the type different from the test pattern data is recorded on the neighboring track(s) at the time of reproducing the test pattern data.

According thereto, since the data of the neighboring track(s) is simultaneously reproduced, the reproducing level becomes high in the defocusing condition but amount of crosstalk also increases. Accordingly, since jitter element increases, such a mistake to erroneously determine the defocusing condition as the just focusing condition can be eliminated. That is, the focus servo signal providing the just focusing condition can be obtained accurately.

Moreover, in the optical disc recording/reproducing apparatus of the present invention, a difference between the focus error signal and focus bias signal generated from the reproduced data can be obtained. This difference is then output as the focus servo signal and the focus bias value providing the minimum jitter amount is selected as the optimum focus bias.

According thereto, since an error rate can be improved by reproducing the signal with the pre-adjusted focus servo signal, the reproducing characteristic of the optical disc can be improved. Therefore, the present invention can be effectively applied to an optical disc recording/reproducing apparatus using a magneto-optical disc.

While the above is a complete description of the preferred embodiments of this invention, various alternatives, modifications and equivalents maybe used. Therefore, the above description should not be taken as limiting the scope of the invention as defined by the appended claims.

What is claimed is:

1. A focus control method comprising the steps of:
   recording test pattern data on a predetermined track of an optical disc;
   recording other pattern data different from the test pattern data on a neighboring track of the predetermined track;
   reproducing said test pattern data with a varying focus bias value;
   obtaining a focus servo signal providing a just focusing condition from a jitter amount obtained when said test pattern data is reproduced;
   defining the optimum focus bias of the optical disc from said focus bias signal providing the minimum jitter amount; and
   executing focus servo function based on said optimum focus bias;
   wherein said test pattern data is incremental pattern data in which the recorded mark length increases gradually, and the data recorded on said neighboring track provides the longest mark length formed by the data so that crosstalk is maximized.

2. An optical disc recording/reproducing apparatus comprising:

means for recording test pattern data on a predetermined track of the tracks provided in a test pattern area of an optical disc and for recording other pattern data different from the test pattern data on a neighboring track of the predetermined track;

means for reproducing said test pattern data from said predetermined track with a varying focus bias value;

a PLL circuit for receiving the reproduced data;

jitter amount calculating means for calculating a jitter amount corresponding to said focus bias value when a phase error signal obtained by said PLL circuit is supplied; and focus servo control means for determining an optimum focus bias signal based on the calculated jitter amount, compensating for the focus error signal with the focus bias signal, and outputting the focus servo signal based on the compensated focus error signal;

wherein said focus servo control means has a memory, said memory storing the focus bias value sequentially varied and jitter amount corresponding to each focus bias value, and said focus servo control means outputs the focus servo signal on the basis of said focus bias value providing the minimum jitter amount stored, and said recording means records, on said predetermined track, increment pattern data having a mark length that gradually increases as the test pattern and also records, on said neighboring track, the test pattern including the pattern of the maximum mark length.

* * * * *